US012752622B2

(12) United States Patent
Zhao et al.

(10) Patent No.: US 12,752,622 B2
(45) Date of Patent: Oct. 6, 2026

(54) SYSTEM AND METHOD FOR ALLOCATING BATTERY POWER FOR ELECTRIC VEHICLES WITH A DISCONNECT CLUTCH

(71) Applicant: Ford Global Technologies, LLC, Dearborn, MI (US)

(72) Inventors: Yanan Zhao, Ann Arbor, MI (US); Kyle Culek, Birmingham, MI (US); Guopeng Hu, Northville, MI (US); Matthew Shelton, Grosse Ile, MI (US); Yang Xu, Canton, MI (US); Zhengyu Dai, Canton, MI (US); Ashok Rodrigues, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 173 days.

(21) Appl. No.: 18/531,245

(22) Filed: Dec. 6, 2023

(65) Prior Publication Data

US 2025/0187433 A1 Jun. 12, 2025

(51) Int. Cl.

| | |
|---|---|
| ***G06F 17/00*** | (2019.01) |
| ***B60K 17/356*** | (2006.01) |
| ***B60K 23/08*** | (2006.01) |
| ***B60L 15/20*** | (2006.01) |
| ***B60L 50/60*** | (2019.01) |
| ***B60L 58/12*** | (2019.01) |

(52) U.S. Cl.

CPC ........ *B60K 23/0808* (2013.01); *B60K 17/356* (2013.01); *B60L 15/2054* (2013.01); *B60L 50/60* (2019.02); *B60L 58/12* (2019.02); *B60L 2220/42* (2013.01); *B60L 2240/421* (2013.01); *B60L 2240/545* (2013.01); *B60L 2240/647* (2013.01); *B60L 2240/662* (2013.01)

(58) Field of Classification Search

CPC ......................... B60K 23/0808; B60K 17/356; B60K 17/354; B60L 15/2054; B60L 50/60; B60L 58/12; B60L 2220/42; B60L 2240/421; B60L 2240/545; B60L 2240/647; B60L 2240/662

USPC ........................................................... 701/22

See application file for complete search history.

(56) References Cited

U.S. PATENT DOCUMENTS 6,932,738 B2 * 8/2005 Aoki ........................ B60K 6/44 477/5

7,497,285 B1 * 3/2009 Radev ...................... B60K 6/52 180/65.23

(Continued)

FOREIGN PATENT DOCUMENTS

EP 4582320 A1 * 7/2025 ............ B60W 20/10

JP 2004208445 A * 7/2004

(Continued)

OTHER PUBLICATIONS

Improved efficiency with adaptive front and rear axle independently driven powertrain disconnect capability (Year: 2023).*

*Primary Examiner* — Ronnie M Mancho

(74) *Attorney, Agent, or Firm* — McCoy Russell LLP

(57) ABSTRACT

Methods and system are described for allocating power to two electric machines when closing of a disconnect clutch is requested. In one example, the allocation of power may be based on a level of urgency for closing the disconnect clutch. Priority for supplying power to a secondary drive unit may be increased in response to a high urgency level.

20 Claims, 4 Drawing Sheets

(56) References Cited

U.S. PATENT DOCUMENTS

| | | | | |
|---|---|---|---|---|
| 11,173,782 | B2 * | 11/2021 | Kumar | B60K 6/48 |
| 12,145,438 | B1 * | 11/2024 | Zhao | B60K 25/06 |
| 12,169,019 | B1 * | 12/2024 | Zhao | B60K 25/00 |
| 2004/0147366 | A1 * | 7/2004 | Aoki | B60K 6/52<br>477/6 |
| 2021/0053551 | A1 * | 2/2021 | Kava | B60W 20/10 |
| 2021/0394738 | A1 * | 12/2021 | Cho | B60L 15/2045 |
| 2023/0226927 | A1 | 7/2023 | Modak et al. | |
| 2025/0187433 | A1 * | 6/2025 | Zhao | B60K 17/356 |

FOREIGN PATENT DOCUMENTS

| | | | | |
|---|---|---|---|---|
| JP | 3924540 | B2 | * | 6/2007 |
| JP | 2012086701 | A | * | 5/2012 |

* cited by examiner

SYSTEM AND METHOD FOR ALLOCATING BATTERY POWER FOR ELECTRIC VEHICLES WITH A DISCONNECT CLUTCH

FIELD

The present description relates generally to methods and systems for controlling electrical power delivery to a main electric machine and a secondary electric machine. Power delivery may be managed when engaging a driveline disconnect clutch.

BACKGROUND/SUMMARY

A vehicle may be configured with four-wheel drive to increase traction and/or increase vehicle stability. Electric vehicles may also be configured as four-wheel drive vehicles. Four-wheel drive electric vehicles, similar to vehicles having internal combustion engines, may not be as efficient as similar two-wheel drive vehicles. Therefore, four-wheel drive electric vehicles may not be able to travel as far on a fully charged battery as a similar vehicle that is configured with two-wheel drive. As such, some vehicle users may experience "range anxiety" with their four-wheel drive vehicle. The users "range anxiety" may be a concern that their four-wheel drive vehicle may not have a capacity to reach a charging station to recharge the electric vehicle. Accordingly, it may be desirable for a four-wheel drive vehicle to include a driveline disconnect clutch to disconnect at least a part of the four-wheel drive system to increase vehicle driveline efficiency.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
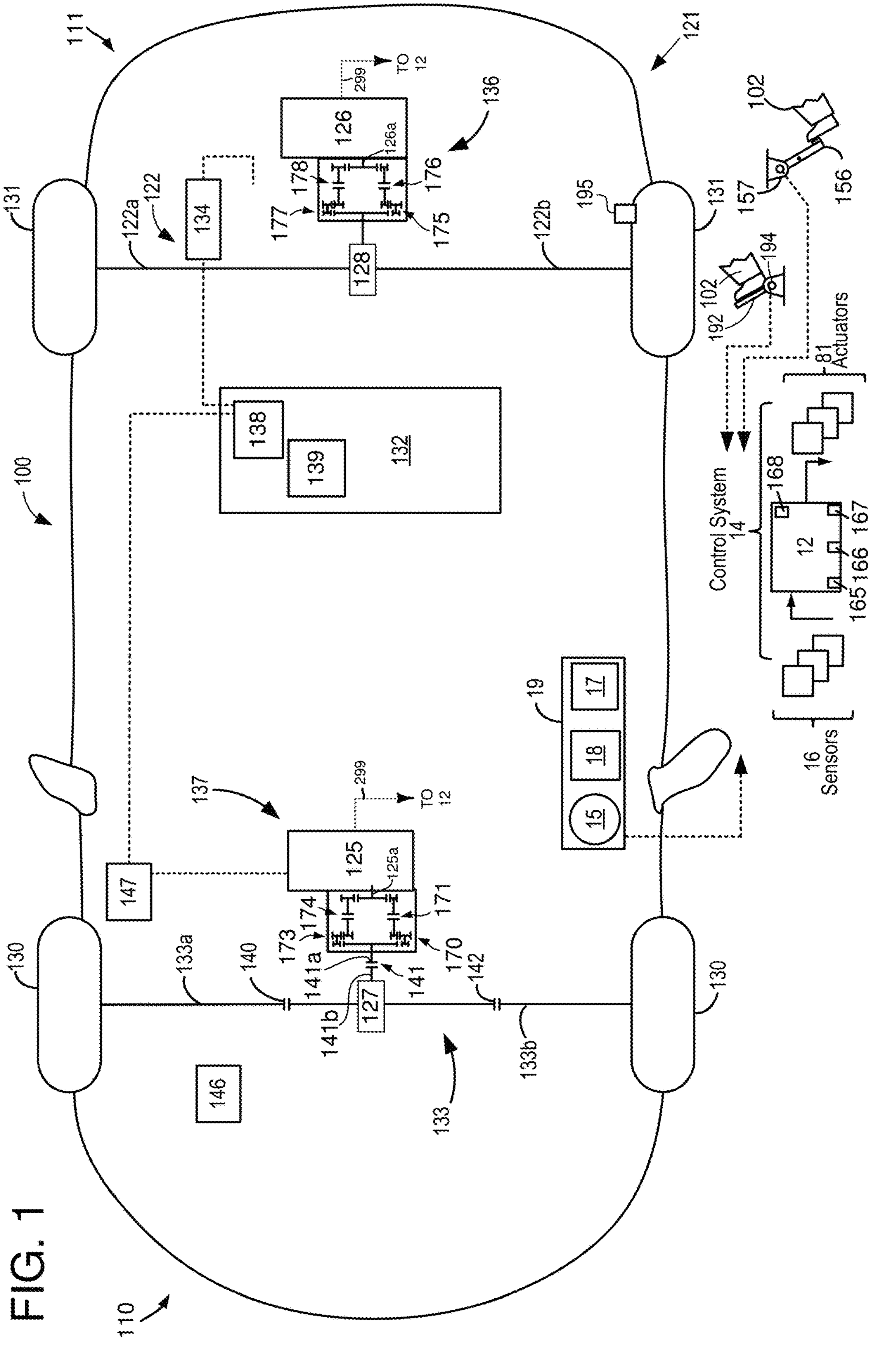
FIG. 1 is a schematic diagram of a vehicle driveline is shown.
Figure 2:
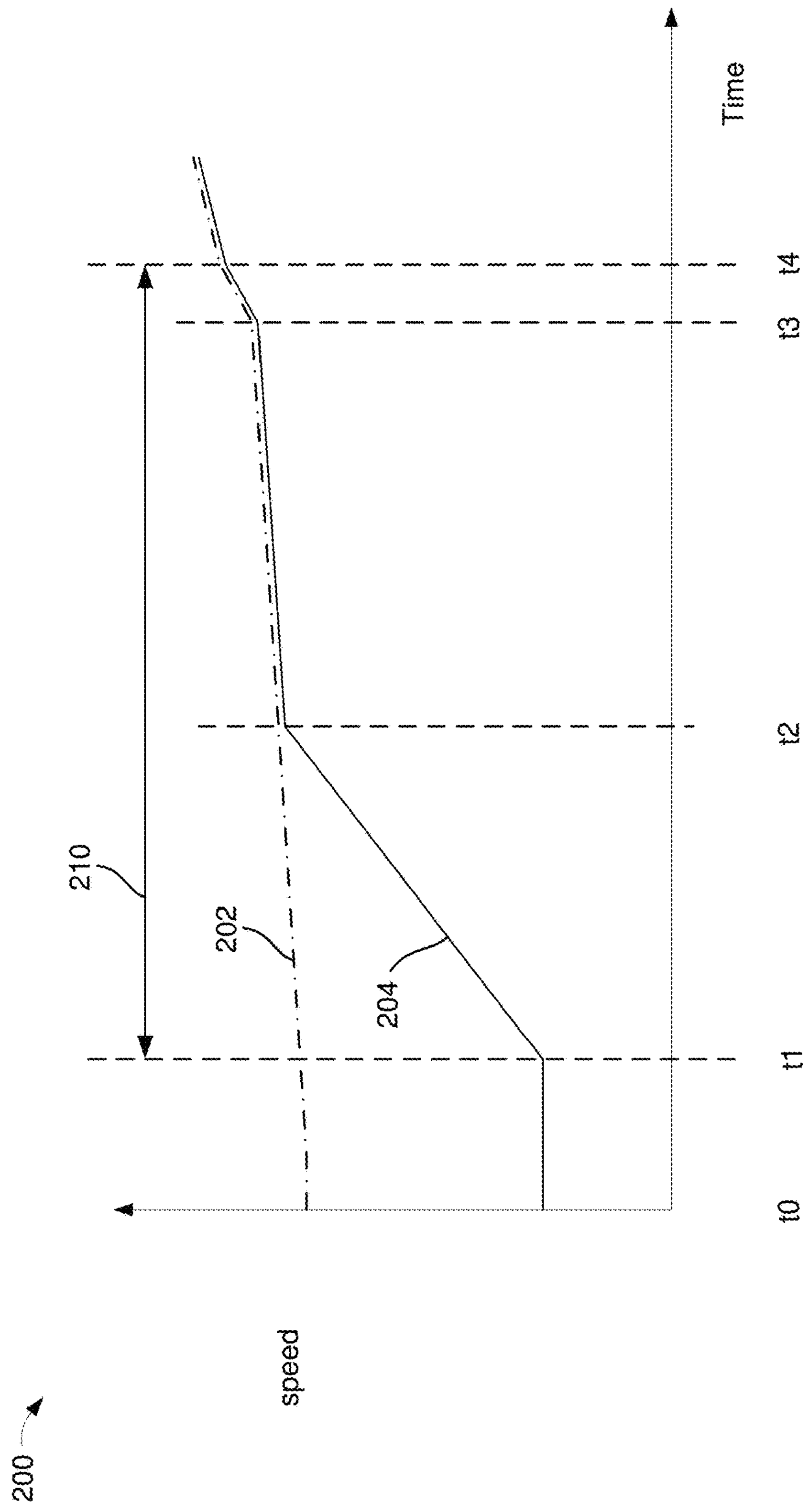
FIG. 2 shows an example sequence for closing a disconnect clutch that couples an electric machine with a driveline.
Figure 3:
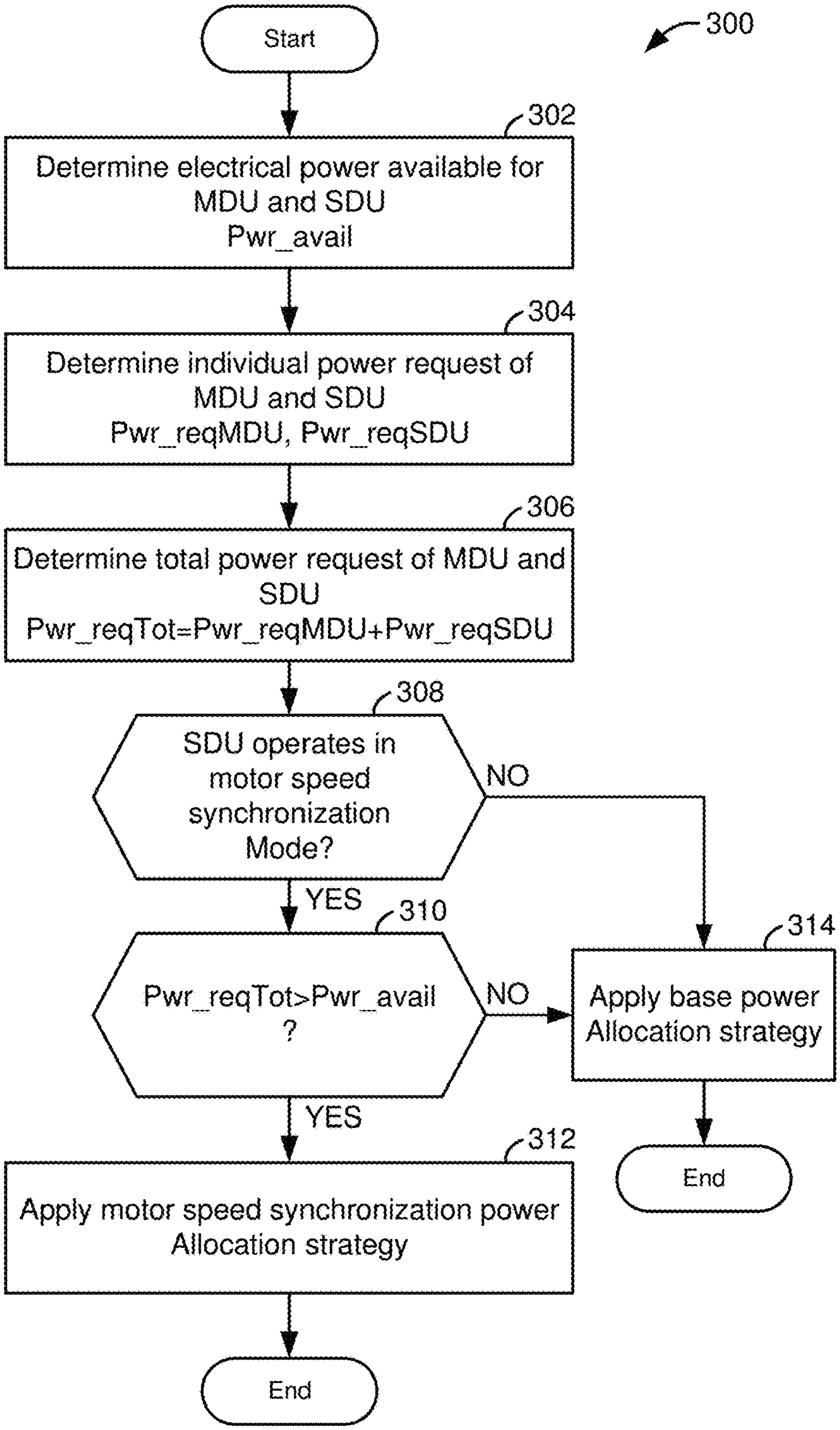
FIGS. 3 and 4 show example methods for managing electric power consumption during engagement of a disconnect clutch.
Figure 4:
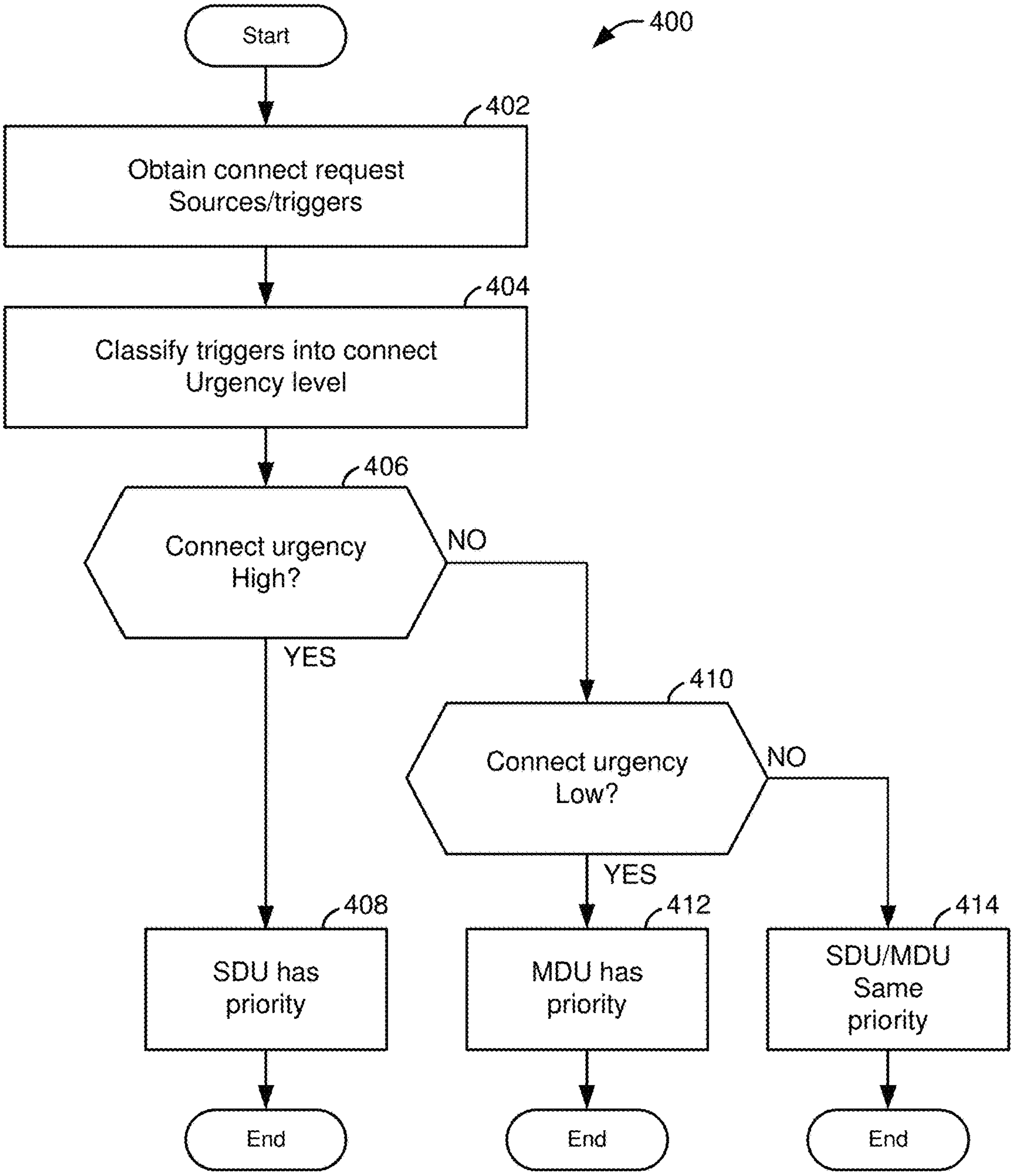

The following description relates to systems and methods for managing electric power delivery for a four-wheel drive electric vehicle. In one example, the four-wheel drive vehicle may include a driveline disconnect clutch that may be opened to decouple an electric propulsion source from vehicle wheels. A driveline of a non-limiting four-wheel drive electric vehicle is shown in FIG. 1. FIG. 2 shows an example disconnect clutch closing sequence according to the methods of FIGS. 3 and 4. Methods for managing power for an electric vehicle are shown in FIGS. 3 and 4.

A four-wheel drive vehicle may include two propulsion sources. One propulsion source may supply power to a front axle and the other propulsion source may supply power to a rear axle.

One of the propulsion sources may be selectively coupled to its respective axle via a disconnect clutch. The disconnect clutch may be opened to reduce energy consumption when four-wheel drive and/or stability control may not provide significant benefits due to favorable driving conditions. However, if driving conditions change and four-wheel drive is requested, it may take more electric power than an electric energy storage device has available to match a speed of an electric machine with driveline speed in a predetermined amount of time. In order to reduce a possibility of drawing excess electric power from the electric energy storage device, it may be desirable to manage power consumed by electric machines that are electrically coupled to the electric energy storage device.

The inventors herein have recognized the above-mentioned issues and have developed a method for operating a vehicle, comprising: adjusting an amount of power delivered to a main drive unit (MDU) and a secondary drive unit (SDU) in response to a request to close a disconnect clutch and a maximum amount of power that is available from a traction battery, where the disconnect clutch is configured to couple the SDU to one or more wheels.

By adjusting amounts of power supplied to MDU and SDU in response to a request to close a disconnect clutch, it may be possible to provide the technical result of timely controlling disconnect clutch closing while controlling electric power consumption from a traction battery to reduce a possibility of drawing excess power. Further, driveline torque disturbances may be managed during closing of a driveline disconnect clutch.

The present description may provide several advantages. In particular, the approach may allow timely driveline disconnect clutch closing and smooth driveline operation. In addition, the approach may lower a possibility of requesting excess power from a traction battery.

FIG. 1 illustrates an example vehicle propulsion system 100 for vehicle 121. A front portion of vehicle 121 is indicated at 110 and a rear portion of vehicle 121 is indicated at 111. Vehicle propulsion system 100 includes at two propulsion sources including front electric machine 125 and rear electric machine 126. Electric machines 125 and 126 may consume or generate electrical power depending on their operating mode. Throughout the description of FIG. 1, mechanical connections between various components are illustrated as solid lines, whereas electrical connections between various components are illustrated as dashed lines.

Vehicle propulsion system 100 has a front axle 133 and a rear axle 122. In some examples, rear axle may comprise two half shafts, for example first half shaft **122*a*, and second half shaft 122*b*. Likewise, front axle 133 may comprise a first half shaft 133*a* and a second half shaft 133*b*. Vehicle propulsion system 100 further has front wheels 130 and rear wheels 131. In this example, front wheels 130 may be selectively driven via electric machine 125. Rear wheels 131 may be driven via electric machine 126**.

The rear axle 122 is coupled to electric machine 126, and electric machine 126 may be referred to as a main drive unit (MDU). Rear drive unit 136 may transfer power from electric machine 126 to axle 122 resulting in rotation of drive wheels 131. Rear drive unit 136 may include a low gear set 175 and a high gear set 177 that are coupled to electric machine 126 via output shaft **126*a* of rear electric machine 126. Low gear set 175 may be engaged via fully closing low gear clutch 176. High gear set 177 may be engaged via fully closing high gear clutch 178. High gear clutch 178 and low gear clutch 176 may be opened and closed via commands received by rear drive unit 136 over controller area network (CAN) 299. Alternatively, high gear clutch 178 and low gear clutch 76 may be opened and closed via digital outputs or pulse widths provided via control system 14. Rear drive unit 136 may include differential 128 so that torque may be provided to axle 122***a* and to axle 122*b*. In some examples, an electrically controlled differential clutch (not shown) may be included in rear drive unit 136.

The front axle 133 may be selectively coupled and decoupled to electric machine 125 via disconnect clutch 141. Disconnect clutch 141 includes an input side 141*a* and an output side 141*b*. The input side may be coupled to electric machine 125. The output side may be coupled to differential 127. In this example, electric machine 125 may be referred to as a secondary drive unit (SDU). Alternatively, disconnect clutches 140 and 142 may selectively couple and decouple front wheels 130 to electric machine 125. Front drive unit 137 may transfer power from electric machine 125 to axle 133 resulting in rotation of front wheels 130. Front drive unit 137 may include a low gear set 170 and a high gear set 173 that are coupled to electric machine 125 via output shaft 125*a* of front electric machine 125. Low gear set 170 may be engaged via fully closing low gear clutch 171. High gear set 173 may be engaged via fully closing high gear clutch 174. High gear clutch 174 and low gear clutch 171 may be opened and closed via commands received by front drive unit 137 over CAN 299. Alternatively, high gear clutch 174 and low gear clutch 171 may be opened and closed via digital outputs or pulse widths provided via control system 14. Front drive unit 137 may include differential 127 so that torque may be provided to axle 133*a* and to axle 133*b*. In some examples, an electrically controlled differential clutch (not shown) may be included in rear drive unit 137.

Electric machines 125 and 126 may receive electrical power from onboard electrical energy storage device 132. Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 134 may convert alternating current generated by rear electric machine 126 to direct current for storage at the electric energy storage device 132 and vice versa. A second inverter system controller (ISC2) 147 may convert alternating current generated by front electric machine 125 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, headlights, cabin audio and video systems, etc.

Control system 14 may communicate with one or more of electric machine 125, electric machine 126, energy storage device 132, etc. Control system 14 may receive sensory feedback information from one or more of electric machine 125, electric machine 126, energy storage device 132, etc. Inverters may be included as part of electric machines 125 and 126 when the electric machines are alternating current (AC) electric machines. Further, control system 14 may send control signals to one or more of electric machine 125, electric machine 126, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to a foot drive pedal. Similarly, control system 14 may receive an indication of an operator requested vehicle counteractive drive force via a human operator 102, or an autonomous controller. For example, control system 14 may receive sensory feedback from pedal position sensor 157 which communicates with caliper pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 125, electric machine 126, wheel speed sensor 195, etc., may communicate information to controller 12, regarding various states of electric machine operation. Controller 12 includes non-transitory (e.g., read exclusive memory) 165, random access memory 166, digital inputs/outputs 168, and a microcontroller 167.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 125 and electric machine 126) based on an operator input. Various examples of the operator ignition interface 15 may include interfaces that apply a physical apparatus, such as an active key, that may be inserted into the operator interface 15 to start the electric machines 125 and 126 and to turn on the vehicle, or may be removed to shut down the electric machines 125 and 126 to turn off the vehicle. Other examples may include a passive key that is communicatively coupled to the operator interface 15. The passive key may be configured as an electronic key fob or a smart key that does not have to be inserted or removed from the interface 15 to operate the vehicle electric machines 125 and 126. Rather, the passive key may be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the vehicle controller 12 to start the vehicle.

The system of FIG. 1 provides for a vehicle system, comprising: a first electric machine selectively coupled to a front axle via a disconnect clutch; a second electric machine coupled to a rear axle; one or more controllers including executable instructions stored in non-transitory memory that cause the one or more controllers to control power delivery to the first electric machine and the second electric machine according to a first strategy in response to not operating the first electric machine in a speed synchronization mode, and additional executable instructions that cause the one or more controllers to control power delivery to the first electric machine and the second electric machine according to a second strategy in response to operating the first electric machine in the speed synchronization mode. In a first example, the vehicle system includes where the first strategy is different from the second strategy, and where the first strategy includes adjusting power supplied to the first electric machine according to a present rotational speed of the first electric machine and the second electric machine, torque request estimation of the first electric machine and the second electric machine, power available from the traction battery, and a power request split between the first electric machine and the second electric machine. In a second example that may include the first example, the vehicle system includes where the second strategy adjusts power supplied to the first electric machine and the second electric machine according to a disconnect clutch closing urgency. In a third example that may include one or both of the first and second examples, the vehicle system includes where the disconnect clutch closing urgency is one of a low level, a medium level, and a high level. In a fourth example that may include one or more of the first through third examples, the vehicle system further comprises prioritizing power supplied to the first electric machine over power delivered to the second electric machine when the disconnect clutch closing urgency is at the high level, and where power supplied to the first electric machine is a full power request for speed synchronization. In a fifth example that may include one or more of the first through fourth examples, the vehicle system further comprises prioritizing power supplied to the second electric machine over power delivered to the first electric machine when the disconnect clutch closing urgency is at the low level, and where power supplied to the second electric machine is a full power request for vehicle propulsion to meet driver demand. In a sixth example that may include one or more of the first through fifth examples, the vehicle system further comprises equalizing power supplied to the first electric machine and the second electric machine when the disconnect clutch closing urgency is at the medium level, where power supplied to the first electric machine is based on a first power request ratio, the first power request ratio a power request of the first electric machine divided by a total power request of the first electric machine and the second electric machine, and where power supplied to the second electric machine is based on a second power request ratio, the second power request ratio a power request of the second electric machine divided by a total power request of the first electric machine and the second electric machine. In a seventh example that may include one or more of the first through sixth examples, the vehicle system includes where the speed synchronization mode includes adjusting a rotational speed of the first electric machine or a device coupled to the first electric machine to a rotational speed of a device coupled to a wheel.

Referring now to FIG. 2, a plot of an example prophetic SDU coupling sequence is shown. The prophetic SDU coupling sequence may mechanically couple a SDU with an axle and wheels that are coupled to the axle. The SDU coupling sequence may be performed beginning when a disconnect clutch is open and the SDU is uncoupled from its associated axle.

Plot 200 includes a dashed-dot line 202 that represents driveline rotational speed. In one example, the driveline rotational speed may be based on an average of the wheel speeds of the front axle and the gear ratio between the electric machine and the disconnect clutch. That is, the driveline rotational speed is represented in the rotational speed domain of the electric machine. In other words, dashed-dot line 202 represents the rotational speed of the electric machine if the electric machine were mechanically coupled to the axle. Solid line 204 represents the actual rotational speed of the electric machine. The length of leader 210 represents the amount of time it takes to recouple an uncoupled electric machine to an axle and complete controlled torque request ramp up.

At time t0, the sequence is in a mode where exactly one electric machine is coupled to the vehicle driveline and wheels (not shown) (e.g., two-wheel drive mode). The other electric machine is uncoupled from the vehicle driveline and wheels so that less electric energy may be consumed to propel the vehicle. The speed of the uncoupled electric machine is at zero or a lower speed as indicated by solid line 204. Either the front wheels or the rear wheels may be driven by the exactly one electric machine. In this example, the rear wheels are being driven via an electric machine and the front wheels are decoupled from an electric machine. The driveline rotational speed in the rotational speed domain of the electric machine of the uncoupled axle is at zero or a medium level and it is gradually increasing.

At time t1, a request to close the disconnect clutch and couple the uncoupled electric machine to the axle is generated. This begins the SDU electric machine speed synchronization phase. During this phase, a rotational speed of the uncoupled electric machine is increased so that driveline components (e.g., shafts/gears etc.) that are coupled to the electric machine rotate at a rotational speed that is the same as driveline components (e.g., shafts/gears etc.) that rotate due to rotating vehicle wheels. Thus, a rotational speed of an input side of a disconnect clutch is increased to a rotational speed of an output side of the disconnect clutch, irrespective of the disconnect clutches location along the driveline. The rotational speed of the input side of the disconnect clutch is increased via increasing uncoupled electric machine rotational speed. Increasing rotational speed of the uncoupled electric machine causes solid line 204 to increase toward the dash-dot line 202.

At time t2, the driveline speed in the electric machine speed domain is equal to the SDU rotational speed within a tolerance range (e.g., +−5 rad/sec). In other words, the rotational speed of the input side of the disconnect clutch is almost the same as the rotational speed of the output side of the disconnect clutch. Therefore, the disconnect clutch is commanded closed. Since the speeds are equal or nearly equal, the disconnect clutch slip may be reduced and torque transfer through the disconnect clutch may be smooth.

At time t3, the disconnect clutch is fully closed so output torque or power of the SDU is increased so that the MDU and SDU provide the requested driver demand torque or power. The SDU torque is gradually increased until time t4 when it reaches its requested value.

Referring now to FIG. 3, a flowchart of a method for determining an electric power allocation strategy is shown. The method of FIG. 3 may be incorporated into and may cooperate with the system of FIG. 1. Further, at least portions of the method of FIG. 3 may be incorporated as executable instructions stored in non-transitory memory while other portions of the method may be performed via a controller transforming operating states of devices and actuators in the physical world.

At 302, method 300 determines how much electric power of the electric energy storage source is available for the MDU and the SDU to propel the vehicle. In one example, the amount of available power that the electric energy storage device may provide to the MDU and SDU may be determined via the following equation:

$$Pwr\_\text{avail}=\text{EESDAP}(SOC,T)$$

where Pwr_avail is the electric power that is available from the traction battery to the MDU and SDU, EESDAP is a function that returns the amount of electric power that is available from the traction battery, SOC is battery state of charge, and Tis battery temperature. Method 300 proceeds to 304.

At 304, method 300 determines individual power requests for the MDU and SDU via the following equations;

$$\text{Pwr\_reqPDU} = \text{Tq\_reqMDU}\cdot\text{Spd\_MDU}$$

$$\text{Pwr\_reqSDU} = \text{Tq\_reqSDU}\cdot\text{Spd\_SDU}$$

Where Pwr_reqMDU is the power request for the MDU, Tq_reqMDU is the torque request for the MDU, Spd_MDU is the rotational speed of the MUD, Pwr_reqSDU is the power request for the SDU, Tq_reqSDU is the torque request for the SDU, and Spd_SDU is the speed of the SDU. The Tq_reqMDU is a value that is based on driver demand pedal position and a requested torque split between the MDU and SDU. The requested torque split between the MDU and SDU may be based on vehicle lateral and longitudinal operating conditions. The Tq_reqSDU value may be determined in a similar way. The MDU and SDU speeds may be determined via speed sensors. Method 300 proceeds to 306.

At 306, method 300 determines a total amount of power that is requested for the MDU and the SDU. The total amount of power may be determined via the following equation:

$$\text{Pwr\_reqTot} = \text{Pwr\_reqMDU} + \text{Pwr\_reqSDU}$$

where Pwr_reqTot is the total amount of power requested for the MDU and SDU. Method 300 proceeds to 308.

At 308, method 300 judges whether or not the SDU is operating in a motor speed synchronization mode. The SDU may operate in a speed synchronization mode when the rotational speed of the SDU is controlled so that a speed of the SDU or a shaft that is coupled to the SDU is adjusted to a rotational speed of a shaft or gear that is coupled to a wheel when the disconnect clutch (e.g., 141 of FIG. 1) is in an open state. The rotational speed of the SDU may be increased from zero or a lower speed as shown in FIG. 2 until it matches the speed of a shaft or gear that is coupled to the wheel. If method 300 judges that the SDU is operating in a motor speed synchronization mode, the answer is yes and method 300 proceeds to 310. Otherwise, the answer is no and method 300 proceeds to 314.

At 310, method 300 judges whether or not the total power requested of the SDU and MDU (Pwr_reqTot) is greater than the power that is available from the traction battery (Pwr_avail). If so, the answer is yes and method 300 proceeds to 312. Otherwise, the answer is no and method 300 proceeds to 314.

At 314, method 300 applies a base power allocation strategy to supply electric power to the SDU and MDU. The base power allocation strategy may deliver the requested amount of SDU power from the traction battery to the SDU. Further, the base power allocation strategy may deliver the requested amount of MDU power from the traction battery to the MDU. In one example, the base allocation strategy determines the amount of power to deliver to the MDU according to a present rotational speed of the MDU and SDU, torque request and estimation of actual motor torque of the MDU and the SDU, power that is available from the traction battery, and a power request split between the MDU and SDU as a function of power request from MDU and SDU. Method 300 proceeds to exit.

At 312, method 300 applies a motor speed synchronization power allocation strategy to control electric power flow to the MDU and the SDU. In particular, method 300 applies the method of FIG. 4 and the MDU and SDU are supplied with electric power from the traction battery according to the method of FIG. 4.

Referring now to FIG. 4, a flowchart of a method for suppling electric power to a MDU and SDU according to a motor speed synchronization power allocation strategy is shown. The method of FIG. 4 may be incorporated into and may cooperate with the system of FIG. 1. Further, at least portions of the method of FIG. 4 may be incorporated as executable instructions stored in non-transitory memory while other portions of the method may be performed via a controller transforming operating states of devices and actuators in the physical world.

At 402, method 400 obtains and determines whether or not conditions or triggers are present to request closing the disconnect clutch. The conditions or triggers may include but are not limited to a change in road surface coefficient of friction, user request for four-wheel drive, a rapid increase rate of driver demand torque, a traction control event (e.g., detection of wheel slip above a calibratable threshold), etc. Method 400 determines whether or not any conditions or triggers are present to request closing the disconnect clutch and proceeds to 404.

At 404, method 400 classifies the requests for closing or connecting the disconnect clutch into urgency levels. In one example, method 400 may classify each of the conditions or triggers for closing the disconnect clutch into one of three categories: low urgency, medium urgency, or high urgency. These categories may indicate a timeliness for closing the disconnect clutch. For example, a high urgency may be for instances when the driveline disconnect clutch is to close within 200 milliseconds of being requested to do so. A medium urgency may be for instances when the driveline disconnect clutch is to close within 350 milliseconds of being requested to do so, and a low urgency may be for instances when the driveline disconnect clutch is to close within 500 milliseconds of being requested to do so.

High urgency requests for closing the disconnect clutch may be based on vehicle stability, traction control, a change in road coefficient of friction, and intent to change the vehicle's present location quickly (e.g., high and or rapidly changing driver demand torque or power) so that the vehicle may deliver four-wheel drive as soon as may be possible. Medium urgency requests for closing the disconnect clutch may include but are not limited to a user's intent to enter four-wheel drive (e.g., a user request for four-wheel drive input to a human/machine interface), transitioning the vehicle from on-road to off-road (e.g., rough road being detected via an rate of change of speed sensor), and other similar circumstances. Low urgency requests for closing the disconnect clutch may include but are not limited to falling or low ambient air temperature, vehicle speed change, and automatic drive mode changes. Method 400 proceeds to 406.

At 406, method 400 judges if the present disconnect clutch closing or connection is of high urgency. If so, the answer is yes and method 400 proceeds to 408. Otherwise, the answer is no and method 400 proceeds to 410. If there are not conditions to connect the disconnect clutch and enter four-wheel drive, method 400 exits.

At 408, method 400 prioritizes the power request for the SDU over the power request for the MDU. By prioritizing the power request for the SDU over the power request for the MDU, method 400 may synchronize the speed of the SDU, or a shaft or gear that is coupled to the SDU when the disconnect clutch is open, with a speed of a shaft or gear that is coupled to a wheel when the disconnect clutch is open. Consequently, the vehicle may enter four-wheel drive more quickly than other priorities.

Prioritizing power requested for the SDU over power requested for the MDU may be accomplished via setting the maximum amount of power that is available for the SDU (PwrSDUMax) equal to the power that is requested for the SDU (PwrreqSDU). Further, the minimum power demand for the SDU (PwrSDUmin) is equal to zero or a small value (e.g., less than 300W) to ensure the SDU power request is prioritized over the MDU power request.

The SDU may be commanded to its requested value and the MDU power may be adjusted according to the following equation:

$$PwrMDUMax = PwravailMax - PwrSDUMax$$

where PwrMDUMax is the maximum power that the MDU may be commanded to provide, PwravailMax is the maximum positive power (e.g., power for discharging the traction battery and providing propulsive effort by the SDU and/or MDU) that may be supplied by the traction battery, and PwrSDUMax is the power that is being requested for the SDU so that a rotational speed of the SDU or shaft or gear coupled to the SDU matches a speed of a shaft of gear that is coupled to a wheel. Thus, the MDU may be allocated an amount of power that is based on a requested amount of SDU power and output power that is available from the traction battery. In particular, the amount of power that may be supplied to the MDU is less than or equal to the amount of power that is available from the traction battery minus the amount of power that is requested for the SDU. Method 400 supplies power to the SDU and the MDU according to these limitations. Method 400 closes the disconnect clutch in response to the rotational speed of the SDU being within a threshold speed of the driveline rotational speed. And, the threshold speed can be calibrated per connect urgency level (e.g., the higher the urgency level, the bigger the threshold). Method 400 proceeds to exit.

At 410, method 400 judges if the present disconnect clutch closing or connection is of low urgency. If so, the answer is yes and method 400 proceeds to 412. Otherwise, the answer is no and method 400 proceeds to 414.

At 412, method 400 prioritizes the power request for the MDU over the power request for the SDU. By prioritizing the power request for the MDU over the power request for the SDU, method 400 may provide the driver demanded wheel torque so that the vehicle may have a greater possibility of increasing vehicle speed smoothly along with lower driveline torque disturbance. Consequently, vehicle drivability may be granted higher priority than entering four-wheel drive.

Prioritizing power requested for the MDU over power requested for the SDU may be accomplished via setting the maximum amount of power that is available for the MDU (PwrMDUMax) equal to the power that is requested for the MDU (PwrreqMDU). Further, the minimum power demand for the MDU (PwrMDUmin) is equal to zero or a small value (e.g., less than 300 W) to ensure the MDU power request is prioritized over the SDU power request.

The MDU may be commanded to its requested value and the SDU power may be adjusted according to the following equation:

$$PwrSDUMax = PwravailMax - PwrMDUMax$$

where PwrSDUMax is the maximum power that the SDU may be commanded to provide, PwravailMax is the maximum positive power (e.g., power for discharging the traction battery and providing propulsive effort by the SDU and/or MDU) that may be supplied by the traction battery, and PwrMDUMax is the maximum power that may be requested for the MDU to meet driver demand torque. Thus, the SDU may be allocated an amount of power that is based on a requested amount of MDU power and output power that is available from the traction battery. In particular, the amount of power that may be supplied to the SDU is less than or equal to the amount of power that is available from the traction battery minus the amount of power that is requested for the MDU. Method 400 supplies power to the SDU and the MDU according to these limitations. Method 400 closes the disconnect clutch in response to the rotational speed of the SDU being within a threshold speed of the driveline rotational speed. Method 400 proceeds to exit.

At 414, method 400 provides equal priority between the power request for the MDU and the power request for the SDU. By equalizing priority between the power request for the MDU and the power request for the SDU, method 400 may balance SDU connection time with driveline smoothness.

Equalizing priority between power requested for the MDU and power requested for the SDU may be accomplished via the following equations:

$$PwrMDUMax = PwravailMax \cdot \frac{PwrreqMDU}{PwrreqMDU + PwrreqSDU}$$

$$PwrMDUMin = PwravailMin \cdot \frac{PwrreqMDU}{PwrreqMDU + PwrreqSDU}$$

$$PwrSDUMax = PwravailMax \cdot \frac{PwrreqSDU}{PwrreqMDU + PwrreqSDU}$$

$$PwrSDUMin = PwravailMin \cdot \frac{PwrreqSDU}{PwrreqMDU + PwrreqSDU}$$

where PwravailMax is the maximum positive power (e.g., power for discharging the traction battery and providing propulsive effort by the SDU and/or MDU) that may be supplied by the traction battery, PwravailMin is the maximum negative power (e.g., power for charging the traction battery and providing regenerative stopping effort by the SDU and/or MDU), and where the remaining variables are as previously described. With this strategy, each of the MDU's and SDU's power request may not be fully met while being fully compromised. Equalizing the priorities balances disconnect clutch closing time with driveline smoothness. Method 400 supplies power to the SDU and the MDU according to these limitations. Method 400 closes the disconnect clutch in response to the rotational speed of the SDU being within a threshold speed of the driveline rotational speed. Method 400 proceeds to exit.

Thus, method 400 may control power flow from a battery to either of or both of a MDU and a SDU. Prioritizing power delivery to the MDU may increase driveline smoothness and allow driver demand to be met. On the other hand, prioritizing power delivery to the SDU may reduce an amount of time to close a driveline disconnect clutch so that torque may be delivered via two axles to increase vehicle traction and stability.

The method of FIGS. 3 and 4 provides for a method for operating a vehicle, comprising: adjusting an amount of power delivered to a main drive unit (MDU) and a secondary drive unit (SDU) in response to a request to close a disconnect clutch and a maximum amount of power that is available from a traction battery, where the disconnect clutch is configured to couple the SDU to one or more wheels. In a first example, the method includes where the traction battery is configured to deliver power to the MDU and the SDU. In a second example that may include the first example, the method further comprises adjusting the amount of power delivered to the MDU and the SDU based on an urgency indication level. In a third example that may include one or both of the first and second examples, the method includes where the urgency indication level comprises at least three levels including a low urgency, a medium urgency, and a high urgency. In a fourth example that may include one or more of the first through third examples, the method includes where the high urgency level is determined based on a determination of a change in coefficient of friction of a traveling surface. In a fifth example that may include one or more of the first through fourth examples, the method includes where the low urgency level is determined based on an ambient temperature. In a sixth example that may include one or more of the first through fifth examples, the method includes where the medium urgency is determined based on a rough road being detected.

The method of FIGS. 3 and 4 also provides for a method for operating a vehicle, comprising: adjusting an amount of electric power delivered to a secondary drive unit (SDU) to synchronize a rotational speed of the SDU to a driveline rotational speed in response to a request to close a disconnect clutch and a maximum amount of electric power that is available from a traction battery, where the disconnect clutch is configured to couple the SDU to a wheel. In a first example, the method further comprises adjusting power supplied to the SDU and power supplied to a main drive unit (MDU) via the traction battery according to an urgency level. In a second example that may include the first example, the method further comprises closing the disconnect clutch in response to the rotational speed of the SDU or the device coupled to the SDU being within a threshold speed of a driveline rotational speed. In a third example that may include one or both of the first and second examples, the method includes where the maximum amount of electric power that is available from the traction battery is based on battery state of charge and battery temperature. In a fourth example that may include one or more of the first through third examples, the method includes where the threshold speed is different at different urgency levels.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing described is not the exclusive way to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to drivelines with disconnect clutches that are placed at different locations in a driveline. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:

adjusting an amount of power delivered to a main drive unit (MDU) and a secondary drive unit (SDU) in response to a request to close a disconnect clutch and a maximum amount of power that is available from a traction battery, where the disconnect clutch includes an input side and an output side, wherein the input side is coupled to the SDU and the output side is coupled to a differential and is configured to couple the SDU to a first axle and a second axle of the vehicle, wherein a requested amount of SDU power is delivered to the SDU and a requested amount of MDU power is delivered to the MDU when a total of the requested amount of SDU power and the requested amount of MDU power is not greater than the maximum amount of power that is available from the traction battery.

2. The method of claim 1, where the traction battery is configured to deliver power to the MDU and the SDU, and wherein the method includes determining how much power stored in the traction battery is available to the MDU and the SDU to propel the vehicle before adjusting the amount of power.

3. The method of claim 2, further comprising adjusting the amount of power delivered to the MDU and the SDU based on an urgency indication level when the total of the requested amount of SDU power and the requested amount of MDU power is greater than the maximum amount of power that is available from the traction battery.

4. The method of claim 3, where the urgency indication level comprises at least three levels including a low urgency, a medium urgency, and a high urgency, and wherein the urgency indication level indicates a timeliness for closing the disconnect clutch.

5. The method of claim 4, where the high urgency is determined based on a determination of a change in coefficient of friction of a traveling surface, or a detection of wheel slip above a calibratable threshold.

6. The method of claim 4, where the low urgency is determined based on an ambient air temperature.

7. The method of claim 4, where the medium urgency is determined based on a rough road being detected.

8. A vehicle system, comprising:

a first electric machine selectively coupled to a front axle via a disconnect clutch, wherein an input of the disconnect clutch is coupled to the first electric machine and an output of the disconnect clutch is coupled to a first differential;

a front drive unit configured to transfer power from the first electric machine to the front axle;

a second electric machine coupled to a rear axle via a second differential;

a rear drive unit configured to transfer power from the second electric machine to the rear axle;

a traction battery electrically coupled to the first electric machine and the second electric machine; and one or more controllers including executable instructions stored in non-transitory memory that cause the one or more controllers control power delivery to the first electric machine and the second electric machine according to a first strategy in response to not operating the first electric machine in a speed synchronization mode and in response to operating the first electric machine in the speed synchronization mode when a total power requested by the first electric machine and second electric machine is not greater than the power available from the traction battery, and additional executable instructions that cause the one or more controllers to control power delivery to the first electric machine and the second electric machine according to a second strategy in response to operating the first electric machine in the speed synchronization mode.

9. The vehicle system of claim 8, wherein the first strategy is different from the second strategy, and where the first strategy includes adjusting power supplied to the first electric machine according to a present rotational speed of the first electric machine and the second electric machine, torque request and estimation of the actual motor torque of the first electric machine and the second electric machine, power available from the traction battery, and a power request split between the first electric machine and the second electric machine.

10. The vehicle system of claim 9, where the second strategy adjusts power supplied to the first electric machine and the second electric machine according to a disconnect clutch closing urgency in response to an amount of power available from the traction battery being less than a total requested power of the first electric machine and the second electric machine, and wherein the disconnect clutch closing urgency indicates a timeliness for closing the disconnect clutch.

11. The vehicle system of claim 10, where the disconnect clutch closing urgency is one of a low level, a medium level, and a high level, wherein at high urgency the disconnect clutch closes within 200 milliseconds of a request to close the disconnect clutch.

12. The vehicle system of claim 11, further comprising prioritizing power supplied to the first electric machine over power delivered to the second electric machine when the disconnect clutch closing urgency is at the high level, and where power supplied to the first electric machine is a full power request for speed synchronization.

13. The vehicle system of claim 11, further comprising prioritizing power supplied to the second electric machine over power delivered to the first electric machine when the disconnect clutch closing urgency is at the low level, and where power supplied to the second electric machine is a full power request for vehicle propulsion to meet driver demand.

14. The vehicle system of claim 11, further comprising equalizing power supplied to the first electric machine and the second electric machine when the disconnect clutch closing urgency is at the medium level, where power supplied to the first electric machine is based on a first power request ratio, the first power request ratio a power request of the first electric machine divided by a total power request of the first electric machine and the second electric machine, and where power supplied to the second electric machine is based on a second power request ratio, the second power request ratio a power request of the second electric machine divided by a total power request of the first electric machine and the second electric machine.

15. The vehicle system of claim 8, where the speed synchronization mode includes adjusting a rotational speed of the first electric machine to a driveline rotational speed.

16. A method for operating a vehicle, comprising:

judging whether a total power requested of a secondary drive unit (SDU) and main drive unit (MDU) of the vehicle is greater than a power available from a traction battery of the vehicle; and adjusting an amount of electric power delivered to the SDU to synchronize a rotational speed of the SDU to a driveline rotational speed in response to a request to close a disconnect clutch when a total amount of power requested by the SDU and MDU is greater than the power available from the traction battery, where the disconnect clutch is configured to couple the SDU to a wheel.

17. The method of claim 16, further comprising adjusting power supplied to the SDU and power supplied to the MDU via the traction battery according to an urgency level, and wherein the urgency level indicates a timeliness for closing the disconnect clutch.

18. The method of claim 17, further comprising closing the disconnect clutch in response to the rotational speed of the SDU or a device coupled to the SDU being within a threshold speed of the driveline rotational speed.

19. The method of claim 18, further comprising determining the amount of electric power that is available from the traction battery based on battery state of charge and battery temperature.

20. The method of claim 18, where the threshold speed is different at different urgency levels.

* * * * *